3,620,031
UREA PLANT AMMONIUM RECOVERY SYSTEM
Robert N. Tennyson, Anaheim, Calif., assignor to The
Fluor Corporation, Ltd., Los Angeles, Calif.
Filed June 18, 1968, Ser. No. 737,987
Int. Cl. F25j 1/00, 3/06, 3/08
U.S. Cl. 62—17          9 Claims

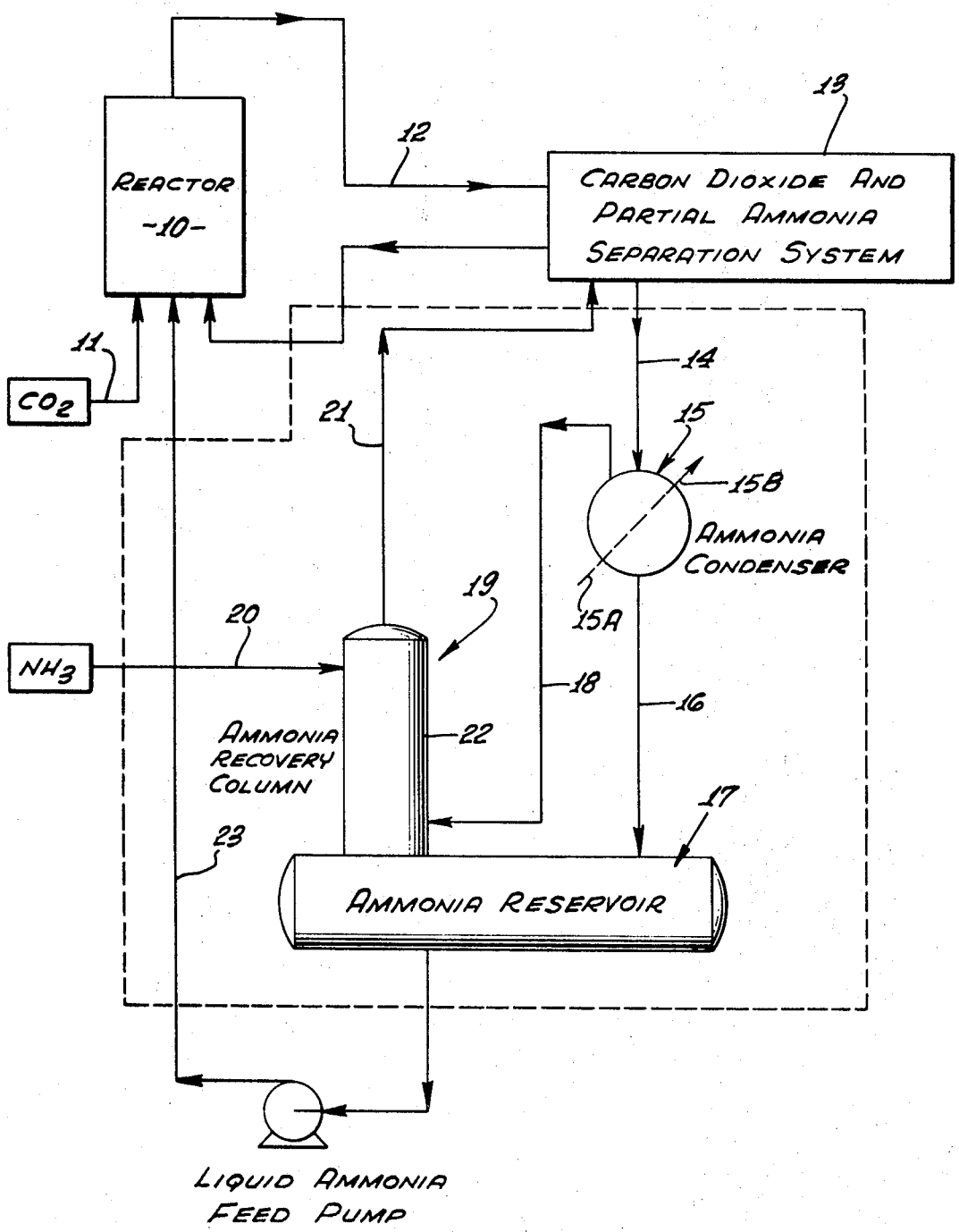

ABSTRACT OF THE DISCLOSURE

The invention is directed to a process for the recovery of ammonia from mixed ammonia and inert gaseous effluents from urea synthesis plants, by passage of such effluent through a first cooling zone to partially condense the ammonia, and then through a second cooling zone where most advantageously, the effluent from the first cooling zone is directly contacted with liquid ammonia to further deplete the inert gas of its ammonia content, liquid ammonia from both cooling zones being recovered and utilized as ammonia feed to the synthesis plant.

BACKGROUND OF THE INVENTION

Urea customarily is synthesized from ammonia and carbon dioxide in plants which employ various systems for the recovery of unreacted ammonia in the gaseous plant effluent, which is a mixture of carbon dioxide and ammonia with inert gases entering the synthesis reactor as impurities in its carbon dioxide and ammonia feed, typically as where the carbon dioxide source is a synthesis gas plant associated with the production of ammonia or hydrogen.

Conventional urea plants have ammonia recovery systems employing an ammonia condenser including one or more shells and tube type exchanges from which the ammonia condensate customarily is accumulated under pressure storage at e.g. 150 to 350 p.s.i.g. and at temperatures of 55° F. to 105° F. Fresh ammonia is fed to such pressure storage and the combined feed and recovered ammonia is pumped to the urea reactor.

The relatively high temperature inert gas content of the reactor effluent passing through the ammonia condensers carries with it correspondingly high equilibrium amounts of ammonia, recovery of which requires additional facilities such as provision for residual ammonia absorption in water or for condensation in additional exchangers. Thus, because of the condensation load requirements imposed on the recovery equipment, its capital costs, operation and maintenance are expensive to a degree warranting in important respects the simplified and more economical recovery system of the present invention.

OBJECTS AND CHARACTERISTICS OF THE INVENTION

This invention contemplates ammonia recovery from residual urea synthesis gases from which carbon dioxide has been separated, by a simplified process employing essentially two cooling and condensing stages, the first of which may be in the nature of one or more conventional ammonia condensers which effect initial and partial condensation ammonia from the synthesis gas effluent.

Limitation of the recovery system to essentially two cooling stages may be permitted by employing a second stage in which the gas is heat-exchanged with liquid ammonia urea reactor feed under conditions such that the ammonia content of the inert gas effluent is sufficiently low as not to require or warrant further recovery, or it futher recovery is warranted it can be accomplished relatively inexpensively, so that the total ammonia recovery requirements are significantly less than conventional practices. While either indirect or direct heat exchanger cooling may be employed in the second stage, most efficient heat transfer is of particular importance, and provision therefore preferably is made for direct contact between the liquid ammonia coolant and the ammonia-inert gas, preferably by condensation of the gaseous ammonia in the cold counter flowing liquid ammonia feed.

Thus by keeping the temperature of the feed ammonia low, the second stage ammonia recovery may be high in comparison with the ammonia condensing capacity of any comparable cooling stage customarily used.

Ammonia recovered from both cooling stages is accumulated as ammonia feed to the synthesis plant.

The invention will be understood more fully from the following detailed description of an illustrative embodiment represented in flow diagram form by the accompanying drawing.

DESCRIPTION OF THE PREFERRED EMBODIMENTS

In reference to the drawing, the reactor 10 is intended to designate any of various known or specific urea synthesis plants or reactors which receive ammonia and carbon dioxide as at 11 for reaction to produce urea, and from which the gaseous effluent containing unreacted ammonia and carbon dioxide together with fixed or inert gases pass, as through line 12, for further treatment. As previously indicated, inert gases such as air, nitrogen, argon, methane and carbon monoxide, may enter the system as impurities in the carbon dioxide feed.

From the reactor the effluent may be taken to any conventional type of system 13 for the separation of carbon dioxide and ammonia from the reaction product. Some of the ammonia, in the order of 20–25 percent of the ammonia content of the gas is recovered separately with the carbon dioxide. The residual ammonia-inert gas mixture, which occasionally may contain small amounts of carbon dioxide, is fed through line 14 to the recovery system with which the invention is primarily concerned and appears diagrammatically within the broken line area.

The line 14 gaseous mixture, typically at a pressure in the range of about 210–300 p.s.i.g. at about 110 to 125° F. and containing 0.2 to 1.0 volume percent of inerts, is passed through a first cooling stage or zone generally indicated at 15 and which may consist of one or more tube and shell type exchangers receiving and discharging water at 15A and 15B, or equivalent equipment for indirect transfer of heat from the gas to a fluid coolant. This first stage cooling drops the gas temperature to e.g. about 90° F. to 10° F. at which the ammonia content of the gas is partially condensed and recovered as by passage through line 16 to an ammonia reservoir 17.

The uncondensed gas leaving the first cooling stage through line 18, and containing typically about 10 to 60 volume percent inert gas, enters the second cooling stage generally indicated at 19 and wherein the gas is cooled by its heat transference to liquid ammonia introduced through line 20. Generally, the residue of ammonia in the line 21 effluent from this second stage will be governed by the liquid ammonia feed in that at corresponding quantity ratios and heat transfer rates, the lower the feed ammonia temperature the lower will be the ammonia content of the uncondensed effluent. Most advantageously ammonia temperatures in the lower −30° F. to +40° F. temperature range are preferred for higher ammonia recovery.

In the interests of highest heat transfer rates and smaller and more economical equipment, the second cooling stage 20 employs a column 22 within which the ammonia feed is passed downwardly in contact with the upwardly flowing gas from line 18 under pressure approximately the first stage condensation pressure. Intimacy of the liquid-gas contact may be promoted by such expedients as trays, packaging or spray devices within the column. Liquid ammonia, inclusive of feed and condensates, passes from column 22 to the reservoir 17.

When the line 20 ammonia feed is low in temperature, i.e. around −25° F. to −30° F., the ammonia content of the line 21 effluent may be sufficiently low, e.g. in the order of 3 to 7%, as not to necessitate or economically warrant further treatment and the gas may be given any desired disposal. Otherwise, as where the ammonia feed temperature ranges upwardly of 35° F., an ammonia content in the effluent of say 25–35 volume percent may warrant further recovery as by conventional means included in the system 13. Notwithstanding any such supplemental recovery, the total ammonia requirements in cost and operation remain significantly below the conventional because of the efficiency and simplicity of the described two stage process.

The feed and total ammonia condensate are supplied through line 23 to the reactor 10 in accordance with its requirements.

An illustrative specific example of material and operating conditions appears in the following tabulation.

|  | Process stream Number | | | | | |
| --- | --- | --- | --- | --- | --- | --- |
|  | 14 | 16 | 18 | 21 | 15A | 15B |
| Component, mole pounds/hr: | | | | | | |
| Ammonia | 4,824.8 | 4,249.3 | 575.5 | 2.2 |  |  |
| Water |  |  |  |  | 175,252 | 175,252 |
| Air | 11.0 |  | 11.0 | 11.0 |  |  |
| Inerts | 16.8 |  | 16.8 | 16.8 |  |  |
| Total, mole pounds/hr | 4,852.6 | 4,249.3 | 603.3 | 30.0 | 175,252 | 175,252 |
| Temperature, °F | 122.0 | 107.5 | 107.5 | −20.0 | 90.0 | 101.0 |
| Pressure, p.s.i.g | 234.6 | 234.6 | 234.6 | 234.6 | 50.0 | 50.0 |
| G.p.m |  |  | 251 |  | 6,310 | 6,310 |

Ammonia condenser 15: Total outside tube area (excluding area in tube sheets): 21,500 sq. ft.

I claim:

1. Process for the recovery of ammonia from residual mixed ammonia and inert gaseous effluent from the carbon dioxide separation stage of a urea synthesis reactor being fed with cold nonaqueous liquid ammonia, that includes after removal of $CO_2$ and $H_2O$ passing effluent therefrom to a first cooling zone and therein partially condensing the ammonia content of the effluent, passing the uncondensed gaseous mixture to a second cooling zone, feeding cold nonaqueous liquid ammonia at a temperature between about −30° F. and +40° F. through said second zone and in direct contact heat transfer relation with said uncondensed gaseous mixture to condense ammonia from the gas, releasing uncondensed predominately inert gas from said second zone, and recovering liquid ammonia from both of said zones and feeding said recovered ammonia to the urea synthesis reactor.

2. The process of claim 1, in which the liquid ammonia and uncondensed gases in said second cooling zone are passed countercurrently therein.

3. The process of claim 1, in which the liquid ammonia and uncondensed gases in said second cooling zone are passed therethrough in direct contact.

4. The process of claim 3, in which the reactor effluent is water-cooled in the first cooling zone.

5. The process of claim 3, in which the liquid ammonia fed to said second zone is passed downwardly therein in contact with an up-flowing stream of said gaseous mixture to absorb ammonia therefrom.

6. The method of claim 1, in which a mixture of carbon dioxide and inert gas is fed to said reactor and the inert gas is contained in said effluent after separation of carbon dioxide therefrom.

7. The method of claim 6, in which the liquid ammonia fed to said second zone is passed downwardly therein in contact with an up-flowing stream of said gaseous mixture to absorb ammonia therefrom.

8. The method of claim 1, in which the ammonia content of said predominately inert gas released from the second zone is below about 25 volume percent.

9. The method of claim 1, in which the liquid ammonia recovered from said zones is collected in the same reservoir for delivery to the reactor.

References Cited
UNITED STATES PATENTS

| 2,214,068 | 9/1940 | Rogers | 260—555 |
| 2,913,493 | 11/1959 | Sze | 260—555 |
| 3,155,722 | 11/1964 | Mavrovic | 260—555 |
| 3,155,723 | 11/1964 | Kurpit | 260—555 |
| 3,354,205 | 11/1967 | Marten | 260—555 |
| 3,378,585 | 4/1968 | Fauser | 260—555 |

NORMAN YUDKOFF, Primary Examiner

A. F. PURCELL, Assistant Examiner

U.S. Cl. X.R.

62—23; 260—555